US009477513B2

(12) United States Patent
Ferrandiz

(10) Patent No.: US 9,477,513 B2
(45) Date of Patent: *Oct. 25, 2016

(54) BATCH SCHEDULING

(71) Applicant: eBay Inc., San Jose, CA (US)

(72) Inventor: Josep M. Ferrandiz, Palo Alto, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,580

(22) Filed: Feb. 1, 2016

(65) Prior Publication Data

US 2016/0147562 A1   May 26, 2016

Related U.S. Application Data

(63) Continuation of application No. 14/077,108, filed on Nov. 11, 2013, now Pat. No. 9,250,952, which is a continuation of application No. 11/645,947, filed on Dec. 27, 2006, now Pat. No. 8,584,122.

(51) Int. Cl.
  *G06F 9/46*   (2006.01)
  *G06F 9/48*   (2006.01)
  *G06F 9/50*   (2006.01)

(52) U.S. Cl.
  CPC ............. *G06F 9/466* (2013.01); *G06F 9/46* (2013.01); *G06F 9/4843* (2013.01); *G06F 9/4881* (2013.01); *G06F 9/4887* (2013.01); *G06F 9/5038* (2013.01)

(58) Field of Classification Search
  None
  See application file for complete search history.

(56) References Cited

U.S. PATENT DOCUMENTS

| 5,881,284 | A | | 3/1999 | Kubo | |
|---|---|---|---|---|---|
| 5,898,870 | A | * | 4/1999 | Okuda | G06F 9/505 718/104 |
| 5,923,875 | A | * | 7/1999 | Tabuchi | G06F 9/505 718/102 |
| 6,353,844 | B1 | * | 3/2002 | Bitar | G06F 9/4887 718/102 |
| 7,266,823 | B2 | | 9/2007 | Alford, Jr. | |
| 7,353,514 | B1 | * | 4/2008 | Camp | G06F 9/4843 718/101 |
| 7,493,622 | B2 | | 2/2009 | Borkan | |

(Continued)

OTHER PUBLICATIONS

"Service Management Functions Job Scheduling", Microsoft TechNet, Microsoft.pdf, (Jan. 25, 2005).

(Continued)

*Primary Examiner* — Hiren Patel
(74) *Attorney, Agent, or Firm* — Schwegman, Lundberg & Woessner, P.A.

(57) ABSTRACT

There is provided a method to schedule execution of a plurality of batch jobs by a computer system. The method includes: reading one or more constraints that constrain the execution of the plurality of batch jobs by the computer system and a current load on the computer system; grouping the plurality of batch jobs into at least one run frequency that includes at least one batch job; setting the at least one run frequency to a first run frequency; computing a load generated by each batch job in the first run frequency on the computer system based on each batch job's start time; and determining an optimized start time for each batch job in the first run frequency that meets the one or more constraints and that distributes each batch job's load on the computer system using each batch job's computed load and the current load.

20 Claims, 5 Drawing Sheets

(56) References Cited

U.S. PATENT DOCUMENTS

| | | | | |
|---|---|---|---|---|
| 7,631,310 | B1* | 12/2009 | Henzinger | G06F 9/505 |
| | | | | 707/999.007 |
| 8,572,616 | B2* | 10/2013 | Cai | G06F 9/5038 |
| | | | | 718/101 |
| 8,584,122 | B2* | 11/2013 | Ferrandiz | G06F 9/4843 |
| | | | | 718/101 |
| 8,707,310 | B2* | 4/2014 | Upadhyaya | G06F 9/4843 |
| | | | | 718/101 |
| 9,250,952 | B2* | 2/2016 | Ferrandiz | G06F 9/4843 |
| 2002/0129083 | A1* | 9/2002 | Abe | G06F 9/4881 |
| | | | | 718/102 |
| 2003/0074463 | A1 | 4/2003 | Swartz et al. | |
| 2003/0126202 | A1* | 7/2003 | Watt | G06F 9/4401 |
| | | | | 709/203 |
| 2003/0191795 | A1 | 10/2003 | Bernardin et al. | |
| 2003/0200252 | A1* | 10/2003 | Krum | G06F 9/505 |
| | | | | 718/102 |
| 2004/0024765 | A1 | 2/2004 | Bauer et al. | |
| 2004/0237087 | A1* | 11/2004 | Ye | G06F 9/4881 |
| | | | | 718/101 |
| 2005/0060401 | A1 | 3/2005 | Brown | |
| 2005/0066330 | A1 | 3/2005 | Kanai et al. | |
| 2005/0138111 | A1 | 6/2005 | Aton et al. | |
| 2005/0171811 | A1 | 8/2005 | Campbell et al. | |
| 2005/0187990 | A1 | 8/2005 | Pace et al. | |
| 2005/0226163 | A1 | 10/2005 | Ramanathan et al. | |
| 2005/0229177 | A1* | 10/2005 | Torii | G06F 9/4887 |
| | | | | 718/100 |
| 2006/0020939 | A1 | 1/2006 | Fellenstein et al. | |
| 2006/0047802 | A1 | 3/2006 | Iszlai et al. | |
| 2006/0048155 | A1* | 3/2006 | Wu | G06F 9/4843 |
| | | | | 718/101 |
| 2006/0149576 | A1* | 7/2006 | Ernest | G06Q 10/06 |
| | | | | 705/39 |
| 2006/0155633 | A1 | 7/2006 | Fellenstein et al. | |
| 2006/0161884 | A1 | 7/2006 | Lubrecht et al. | |
| 2006/0184944 | A1* | 8/2006 | Schwerk | G06F 9/4881 |
| | | | | 718/101 |
| 2006/0218285 | A1 | 9/2006 | Talwar et al. | |
| 2006/0248533 | A1 | 11/2006 | Inari | |
| 2007/0094343 | A1 | 4/2007 | Sangle et al. | |
| 2007/0179931 | A1 | 8/2007 | Juby et al. | |
| 2007/0220516 | A1 | 9/2007 | Ishiguro et al. | |
| 2007/0234363 | A1 | 10/2007 | Ferrandiz | |
| 2008/0098395 | A1 | 4/2008 | Backer | |
| 2014/0075442 | A1 | 3/2014 | Ferrandiz | |

OTHER PUBLICATIONS

"U.S. Appl. No. 11/645,947, Advisory Action mailed Feb. 1, 2013", 3 pgs.

"U.S. Appl. No. 11/645,947, Advisory Action mailed Jun. 28, 2011", 3 pgs.

"U.S. Appl. No. 11/645,947, Final Office Action mailed Apr. 15, 2011", 14 pgs.

"U.S. Appl. No. 11/645,947, Final Office Action mailed Nov. 15, 2012", 13 pgs.

"U.S. Appl. No. 11/645,947, Non Final Office Action mailed Jul. 3, 2012", 16 pgs.

"U.S. Appl. No. 11/645,947, Non-Final Office Action mailed Nov. 4, 2010", 14 pgs.

"U.S. Appl. No. 11/645,947, Notice of Allowance mailed Jul. 8, 2013", 21 pgs.

"U.S. Appl. No. 11/645,947, Preliminary Amendment filed Nov. 15, 2007", 5 pgs.

"U.S. Appl. No. 11/645,947, Response filed Jan. 15, 2013 to Final Office Action mailed Nov. 15, 2012", 10 pgs.

"U.S. Appl. No. 11/645,947, Response filed Mar. 4, 2011 to Non Final Office Action mailed Nov. 4, 2010", 10 pgs.

"U.S. Appl. No. 11/645,947, Response filed Mar. 15, 2013 to Final Office Action mailed Nov. 15, 2012", 9 pgs.

"U.S. Appl. No. 11/645,947, Response filed Jun. 15, 2011 to Final Office Action mailed Apr. 15, 2011", 8 pgs.

"U.S. Appl. No. 11/645,947, Response filed Aug. 15, 2011 to Advisory Action mailed Jul. 28, 2011", 8 pgs.

"U.S. Appl. No. 11/645,947, Response filed Sep. 27, 2012 to Non-Final Office Action mailed Jul. 3, 2012", 12 pgs.

"U.S. Appl. No. 14/077,108, Examiner Interview Summary mailed Jun. 15, 2015", 3 pgs.

"U.S. Appl. No. 14/077,108, Final Office Action mailed May 21, 2015", 24 pgs.

"U.S. Appl. No. 14/077,108, Non Final Office Action mailed Nov. 4, 2014", 30 pgs.

"U.S. Appl. No. 14/077,108, Notice of Allowance mailed Oct. 1, 2015", 25 pgs.

"U.S. Appl. No. 14/077,108, Preliminary Amendment filed Dec. 11, 2013", 7 pgs.

"U.S. Appl. No. 14/077,108, Response filed Aug. 11, 2015 to Final Office Action mailed May 21, 2015", 11 pgs.

"U.S. Appl. No. 14/077,108, Response to Non Final Office Action mailed Nov. 4, 2014", 11 pgs.

"IBM, Job Scheduler for OS/400", IBM corp, (IBM.pdf), (Feb. 1998).

Wang, et al., "A Distributed Load Sharing Batch System", University of Toronto (Wang. pdf), (Apr. 1993).

* cited by examiner

| Job Name | Frequency | No. of Times | Start SLA (hr) | Start SLA (Min) | End SLA (hr) | END SLA (Min) |
|---|---|---|---|---|---|---|
| A | Daily | 1 | 3 | 0 | 10 | 30 |
| B | Daily** | 2 | 10, 20 | 0, 0 | 12, 22 | 0, 0 |
| C | Hourly | 1 | 0, 4, 8, 12, 16, 20 | 0 | Before Next Starts | 0, 0 |

FIG. 3

| Job Name | Total Ops/Min | Avg. Job Dur. (Min) |
|---|---|---|
| A | 1200 | 65 |
| B | 3400 | 22 |
| C | 4000 | 40 |

FIG. 4

| Hour | Measured Ops |
|---|---|
| 1 | 68629 |
| 2 | 62979 |
| 3 | 90248 |
| 4 | 39055 |
| 5 | 111347 |
| 6 | 102321 |
| 7 | 8224 |
| 8 | 30639 |
| 9 | 3996 |
| 10 | 90889 |
| 11 | 31816 |
| 12 | 41592 |
| 13 | 83215 |
| 14 | 67085 |
| 15 | 46287 |
| 16 | 111684 |
| 17 | 80859 |
| 18 | 27267 |
| 19 | 90673 |
| 20 | 68585 |
| 21 | 857 |
| 22 | 117293 |
| 23 | 15577 |

FIG. 5A

| Maximum Ops | 120000 |
|---|---|

5B

| Job Name | Job ID | Start (Hr) | Start (Min) | End (Hr) | End (Min) | Total DB Ops/Min | Avg. Dur. (Min) | SLA Start (Min) | SLA End (Min) |
|---|---|---|---|---|---|---|---|---|---|
| A | 1 | 3 | 0 | 10 | 30 | 1200 | 65 | 180 | 630 |
| B1 | 2 | 10 | 0 | 12 | 0 | 3400 | 22 | 600 | 720 |
| B2 | 3 | 20 | 0 | 22 | 0 | 3400 | 22 | 1200 | 1320 |
| C1 | 4 | 0 | 0 | 4 | 0 | 4000 | 40 | 0 | 240 |
| C2 | 5 | 4 | 0 | 8 | 0 | 4000 | 40 | 240 | 480 |
| C3 | 6 | 8 | 0 | 12 | 0 | 4000 | 40 | 480 | 720 |
| C4 | 7 | 12 | 0 | 16 | 0 | 4000 | 40 | 720 | 960 |
| C5 | 8 | 16 | 0 | 20 | 0 | 4000 | 40 | 960 | 1200 |
| C6 | 9 | 20 | 0 | 24 | 0 | 4000 | 40 | 1200 | 1440 |

FIG. 6

| Job ID | 1 | 2 | 3 | 4 | 5 | 6 | 7 | 8 | 9 |
|---|---|---|---|---|---|---|---|---|---|
| SLA Start | 180 | 600 | 1200 | 0 | 240 | 480 | 720 | 960 | 1200 |
| SLA End | 630 | 720 | 1320 | 240 | 480 | 720 | 960 | 1200 | 1440 |
| Start | 740 | 740 | 740 | 740 | 740 | 740 | 740 | 740 | 740 |
| End | 825 | 762 | 762 | 780 | 780 | 780 | 780 | 780 | 780 |
| Avg. HR | 27% | | | | | | | | |

FIG. 7

| Job ID | 1 | 2 | 3 | 4 | 5 | 6 | 7 | 8 | 9 |
|---|---|---|---|---|---|---|---|---|---|
| SLA Start | 180 | 600 | 1200 | 0 | 240 | 480 | 720 | 960 | 1200 |
| SLA End | 630 | 720 | 1320 | 240 | 480 | 720 | 960 | 1200 | 1440 |
| Start | 180 | 600 | 1200 | 148 | 240 | 480 | 720 | 960 | 1200 |
| End | 245 | 622 | 1222 | 188 | 280 | 520 | 760 | 1000 | 1240 |
| Avg. HR | 32% | | | | | | | | |

FIG. 8

BATCH SCHEDULING

CROSS REFERENCE TO RELATED APPLICATIONS

This application claims priority to U.S. Utility application Ser. No. 11/645,947, dated Dec. 27, 2006, which is hereby incorporated by reference in its entirety.

TECHNICAL FIELD

This disclosure relates generally to data processing systems. More particularly, example embodiments are directed to batch scheduling in data processing systems.

BACKGROUND

In general, batch jobs are back office processes executed by a computer system off-line (e.g., not in real time) and non-interactively (e.g., without user interaction). Because batch jobs are typically compute-intensive, they are generally queued or accumulated during peaks hours when computing resources are unavailable or constrained by real-time activities, and are they then executed during non-peak or idle hours when computing resources are available or less constrained. A batch job is generally stored in an input file—often called a batch file, command file or shell script—which is executed by the computer system. The execution of the input file may produce a number of actions as diverse as updating databases, reconciliation of financial transactions, sending emails to users or producing one or more output files to be used by another batch job or a business.

In general, batch jobs run regularly (e.g. daily, weekly, monthly, etcetera). Many batch jobs access databases to get information needed to perform their function. The execution priority order and frequency of queued or accumulated batch jobs is generally managed by a batch scheduler. Generally, an organization or enterprise may execute its own batch jobs using a standalone batch processing computer system or batch server pool that includes plural servers to process the input files (e.g., batch jobs). However, the organization or enterprise that has finite computing resources may wish to outsource the execution of some or all of its batch jobs, or parts thereof, to an organization that has available computing resources to fulfill this need. Therefore, scheduling performed by the batch scheduler may be constrained by a number of factors, including the following factors.

A first factor may be the available capacity in a batch server pool that processes the batch jobs. The available number of servers in the batch server pool may be a limiting factor in executing a large number and/or time-consuming batch jobs.

A second factor may be the service level agreements (SLAs) between the batch job owner and the computing resource owner (e.g., third-party system). SLAs normally specify the frequency of execution of the batch jobs, as well as the start and completion deadlines of such execution. If SLAs are missed, there may be financial impact to the batch job owner and/or customer impact (e.g., batch jobs that are not completed in time).

A third factor may be the availability, load and capacity of the third-party system (e.g., databases, mail servers, and the like) that are needed to execute or complete the processing of batch jobs. It is often the case that the third-party system is shared by other functions (e.g., other departments, other types of load such as real-time traffic, and the like) and is not readily available, e.g., it may only be used at certain times and/or not all their capacity is available.

As a result of the third constraint factor above, it is often simpler to add capacity to the batch server pool than to make capacity and load changes to the third-party system impacted by the batch job. In these cases, batch job scheduling is actually constrained by the third-party.

BRIEF DESCRIPTION OF THE DRAWINGS

Some embodiments are illustrated by way of example and not limitation in the figures of the accompanying drawings in which:

FIG. 3 is an example table illustrating a service level agreement for plural batch jobs to be executed by the example third party system of FIG. 1.

FIG. 4 is an example table illustrating performance metrics collected for the plural batch jobs of FIG. 3 executed on the example third party system of FIG. 1;

FIG. 5A is an example table illustrating a number of operations per hour measured for the third party system of FIG. 1;

FIG. 5B is an example table illustrating a maximum operations per hour that the third party system of FIG. 1 can perform.

FIG. 6 is an example table that illustrates plural batch jobs of FIG. 3 regularized and grouped by job frequencies in the batch scheduler of FIG. 1;

FIG. 7 is an example display of batch scheduler of FIG. 1 with an initial schedule of regularized batch jobs of FIG. 6 before optimization of the initial schedule;

FIG. 8 is an example display illustrating the initial schedule of FIG. 7 optimized by the batch scheduler of FIG. 1.

DETAILED DESCRIPTION

An example system, method and machine-readable medium for generating an optimized batch schedule are described. In the following description, for the purposes of explanation, numerous specific details are set forth in order to provide a thorough understanding of example embodiments. It will be evident, however, to one skilled in the art that an example embodiment may be practiced without these specific details.

Example embodiments described herein include a system, method, and machine-readable medium for generating an optimized batch schedule that accounts for service level agreements (i.e., "SLAs") and constraints of a third-party system that processes scheduled batch jobs.

Figure 1:
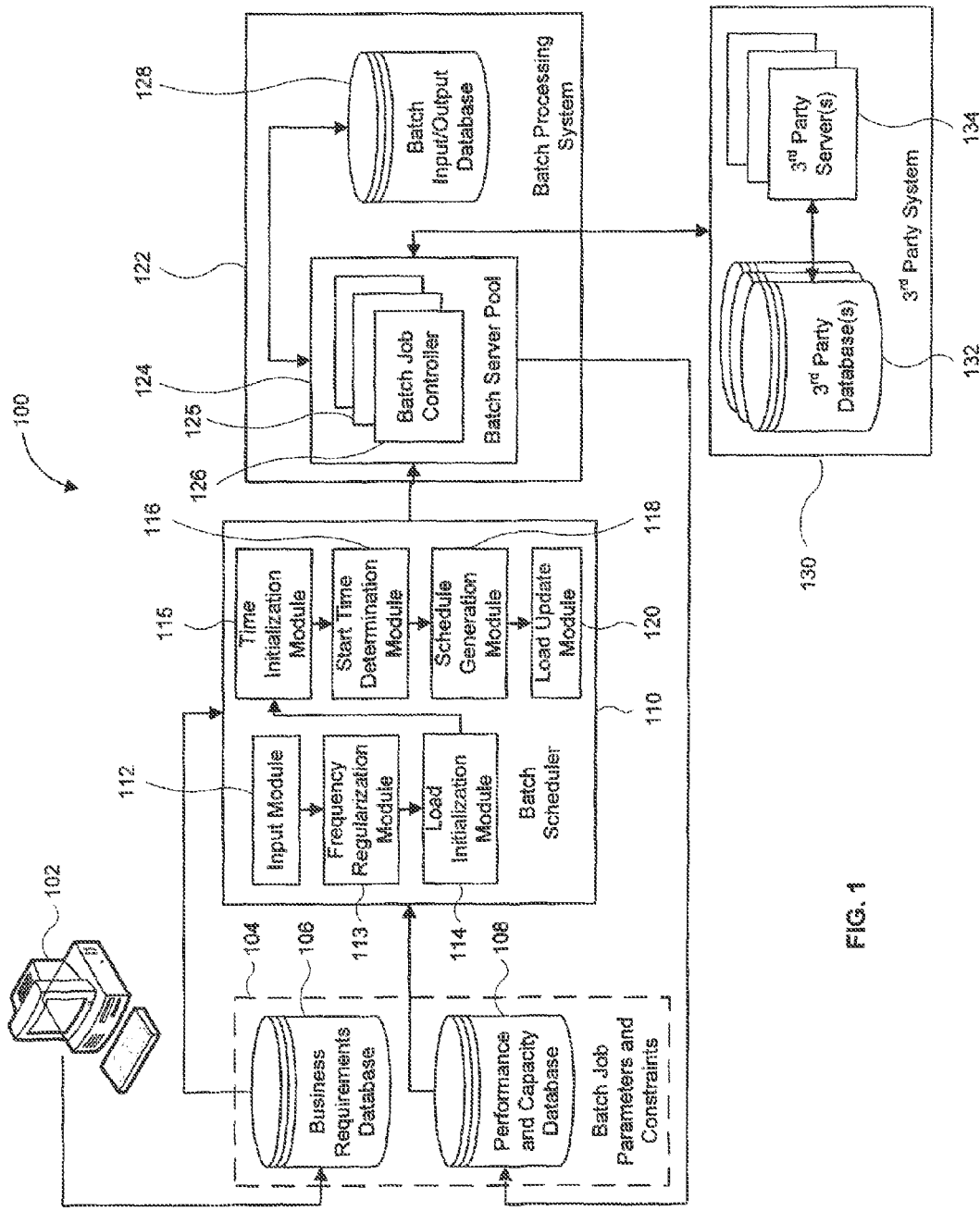
FIG. 1 is a block diagram illustrating an example batch system.

FIG. 1 is a block diagram illustrating an example batch system 100 that accounts for service level agreements (SLAs) and constraints of a third-party system 130 in scheduling execution of a plurality of batch jobs by the third party system 130. The example system 100 includes batch job parameters and constraints 104, a batch scheduler 110, a batch processing system 122 and a third party system 130. For brevity and clarity, example embodiments are described in relation to a third-party system 130. It should be noted, however, that system 100 is easily scalable and plural third-party systems 130 may be provided in different implementations to execute a number of batch schedules of batch jobs. The various elements of the system 100 described herein may be interconnected via any conventional mechanisms, including local area network (LAN), wide area network (WAN), the Internet, and combinations thereof.

Further with reference to FIG. 1, batch job parameters and constraints 104 include databases 106 and 108, which store batch job parameters and constraints utilized by the batch scheduler 110 to generate an optimized schedule of batch jobs to be executed by the third party system 130. More specifically, the business requirements database 106 maintains a service level agreement (SLA) with the third-party system 130 for processing or execution of batch jobs using the third-party system 130. A example SLA will be described below with reference to FIG. 3. At this point, it is sufficient to mention that the SLA includes one or more batch jobs that are to be executed using the third-party system 130 and the SLA further provides a run frequency (e.g., hourly, daily, weekly, etc.), a start time after which the batch job should start and an end time before which the batch job should terminate for the batch job. The SLA may be stored in the business requirement database 106 via manual input or downloaded from a storage device using computer system 102. It is noted that the foregoing batch job parameters and constraints may be stored and maintained in greater or fewer databases, and may be stored in tables, flat files and the like. Furthermore, the foregoing batch job parameters and constraints may also be maintained directly by the batch scheduler 110 in one or more databases, tables, or files.

Still further with reference to FIG. 1, the performance and capacity database 108 maintains batch job parameters and constraints associated with the third-party system 130. For example, the performance and capacity database 108 may maintain batch job metrics, such as a number of operations performed by a batch job and an average duration of execution of the batch job on the third party system 130. The performance and capacity database 108 may further maintain information related to the third party system 130, such as a maximum allowable load (e.g., maximum number of operation per hour) that the third party system 130 may perform per hour and an expected load (e.g., number of operations per hour) that the third party system 130 is expected to perform per hour in a twenty four hour period. The performance and capacity database 108 may also maintain scheduler configuration parameters, such as a busy minute multiplier, an approximation parameter and initial hour parameter, as will be described in greater detail herein. The batch job parameters and constraints associated with the third-party system 130 are downloaded or otherwise provided by a batch server pool 124 of the batch processing system 122, which in turn obtains this information from the third party system 130. The foregoing parameters and constraints will be described in greater detail below with reference to FIGS. 2-4.

Yet further with reference to FIG. 1, databases 106 and 108 are operatively and communicatively interconnected to the batch scheduler 110, which reads the SLA (including batch jobs to be executed) as well as the related batch job parameters and constraints associated with the third-party system 130 from databases 106, 108, and generates an optimized batch schedule of the batch jobs that accounts for the SLA as well as the parameters and constraints of the third-party systems 130, which is to process or otherwise execute the scheduled batch jobs. More specifically, the batch scheduler 110 includes input module 112 that reads the foregoing parameters and constraints from databases 106, 108 into the batch scheduler 110. Furthermore, the batch scheduler 110 includes a frequency regularization module 113, which regularizes and groups batch jobs with irregular run frequencies (e.g., hourly, daily, weekly, monthly, etc.) to respective batch jobs with regular run frequencies. For example, if a batch is to be executed a number of times daily, a number of instances of the batch job are defined for each run of that batch job in the day. The batch scheduler 110 further includes a load initialization module 114, which determines or computes the hourly load (e.g., operations per hour) on the third party system that is generated by non-batch tasks (e.g., web traffic, daemons, etc.) on the third party system 130 as a function of that batch job's start time and end time. Yet further, the batch scheduler 110 includes time initialization module 115, which initializes the start time of each batch job. More specifically, the time initialization module 115 sets the initial start time for each batch job to an arbitrary value h0, which may or may not meet the SLA, parameters and constraints. The initial value of the start time influences the optimized batch schedule. For some selections of start times, the optimization described herein may not be able to determine a schedule that meets the constraints, while for other selections such a schedule may be determined. Thus, setting the initial start time value h0 in the least busy hour of the third party system 130 tends to ensure convergence to a schedule that meets the SLA, parameters and constraints. The batch scheduler 110 also includes a start time determination module 116 that computes an optimized start time for each batch job that meets the SLA, parameters and constraints, and which minimizes the load generated by the batch job on the third party system 130. Still further, the batch scheduler 110 includes a schedule generation module 118 that generates an optimized batch schedule. The batch scheduler 110 also includes a load update module 120 that updates a load produced by the optimized batch job schedule on the third party system 130. More specifically, the load values determined or computed by the load initialization module 114 are updated with the load derived form the batch jobs scheduled by the schedule generation module 118.

In addition with reference to FIG. 1, the batch scheduler 110 is operatively and communicatively interconnected to the batch processing system 122. The batch processing system 122 includes a batch server pool 124, which is bidirectionally interconnected to a batch input/output file database 128 and which is further bidirectionally interconnected to the third-party system 130. Also, the batch server pool 124 further provides the parameters and constraints of the third-party system 130 described herein to the performance and capacity database 108. The batch server pool 124 includes a batch job controller 126, which controls one or more batch servers 125 in executing batch jobs scheduled by the batch scheduler 110 to be executed by the batch processing system 122. The batch job controller 126 may be a software or hardware controller, whose role is to launch batch jobs in each of the batch servers 125 in the batch server pool 124. The batch job controller 126 may be standalone or incorporated into a batch server 125. The batch job controller 126 launches batch jobs in any of the batch servers 125 in the batch server pool 124 according to the batch schedule computed in 118. A batch process while running in one of the batch servers 124 may read data from and write data to the batch input/output database 128. Furthermore, some batch jobs executed on the batch processing system 122 may require access to the third party system 130 during their execution. The third party system 130 .party system 130.

Figure 2:
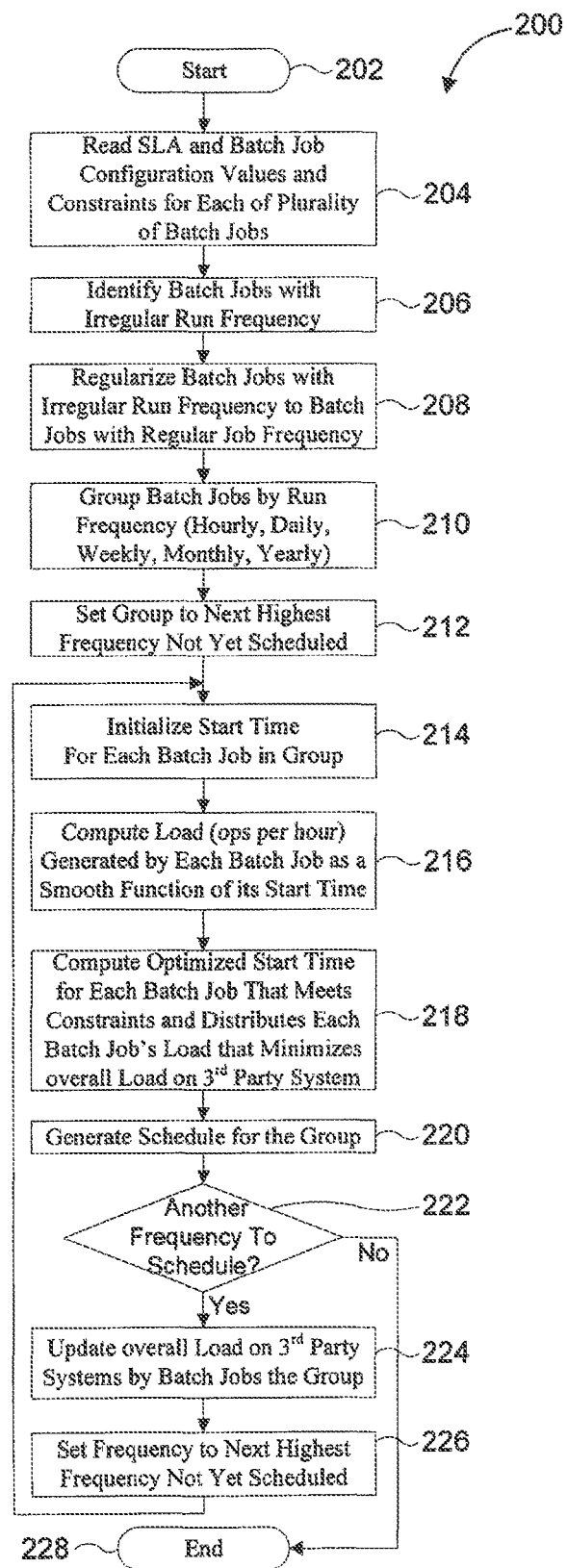
FIG. 2 is a flowchart illustrating an example scheduling and optimization method performed by batch scheduler of FIG. 1.

FIG. 2 is a flowchart illustrating an example scheduling and optimization method 200 performed by batch scheduler 110 that accounts for service level agreements and constraints of a third-party system 130 in scheduling the execution of plural batch jobs by the third-party 130 system illustrated of FIG. 1. The flowchart start at operation 202. At operation 204, the service level agreement (SLA), configuration values, parameters and constraints for each of a plurality of batch jobs are read by the batch scheduler 110 from databases 106, 108. These values may be arranged and stored in tables as illustrated in FIGS. 3-5 and described below with reference therewith. At this point the different constraints, metrics and configuration values will be described generally. More specifically, for each batch job in the SLA, the following batch job parameters are read from the business requirement database 106: 1) a run frequency for the batch job (e.g., hourly, daily, weekly, etc.); 2) start time after which the batch job should start in accordance with the SLA (e.g., Start_SLA(b)); and 3) end time before which the batch job should end in accordance with the SLA (e.g., End_SLA(b)). These parameters are described in more detail in reference to FIG. 3 below. Batch job parameters or metrics for each batch job in the SLA on the third party system 130 that are read from the performance and capacity database 108 include: 1) total operations generated by the batch job on the third party system 130 (e.g., Total_Batch_Ops (b,s)); and 2) the average job duration of the batch job (e.g., Dur(b)). These parameters are described in more detail in reference to FIG. 4 below. Third party system parameters that are read from the performance and capacity database 108 include: 1) an expected load (e.g., number of total operations during each hour on the third party system 130 denoted by Total_RT_Ops (h,s)); and 2) a maximum load (e.g., maximum number of operations the third party system can support denoted by Max_Ops(s)). These parameters are described in more detail in reference to FIGS. 5A-5B below. Lastly, configuration parameters for scheduling that are read from the performance and capacity database 108 include: 1) busy minute multiplier (e.g., BZ_Min); 2) an approximation parameter (e.g., parameter "a"); and 3) and initial hour parameter (e.g., parameter "h0").

Further with reference to FIG. 2, at operation 206 a list of batch jobs with irregular run frequencies is identified. More specifically, batch jobs whose run frequencies are not expressed as daily run frequencies in the SLA (FIG. 3) are identified. This may include batch jobs that run a number of times daily, and those that run weekly, monthly, or at some other time periods. At operation 208, the identified batch jobs that have irregular run frequencies are regularized to batch jobs that have regular run frequencies. The regularization is performed as follows.

First, if batch job b must start to run at a specified time, it is set to start at this specified time and is removed from the list of batch jobs to schedule. Thus, if the batch job must start to run in hour h, the expected load per minute in hour h on the third party system s 130, $$RT\_Ops(h, s) = \frac{TOTAL\_RT\_OPS(h, s)}{60},$$

is incremented by the quantity $$BZ\_Min \frac{Total\_Batch\_Ops(b, s)}{Dur(b)}.$$

The former calculation takes the expected number of total operations during each hour on the third party system 130 (e.g., Total_RT_Ops(h,s)) and divides that number by 60 minutes to obtain a number of expected operations (load) per minute performed on the third party system 130. The latter calculation takes the total operations generated by the batch job on the third party system 130 (e.g., Total_Batch_Ops (b,s)), divides that number by the average job duration of the batch job (e.g., Dur(b)) and multiples by the busy minute multiplier (e.g., BZ_Min)), adding to that result the expected operations per minute performed on the third party system 130 (e.g., RT_Ops(h,s)). The foregoing adds the load generated by the batch job that must run at a specified time to the overall load of the third party system 130. This is done because there is nothing to schedule for a batch job that must run at a specified time. More specifically, SLA and the parameters and constraints imposed determine when this batch job must run. The multiplier (e.g., BZ_Min)) may be set to a value of 2 or 3, or another value. The multiplier captures a worst case scenario for total number of operations (load) performed during the job duration of the batch job b on system s 130, $$BZ\_Min \frac{Total\_Batch\_Ops(b, s)}{Dur(b)}.$$

For example, if in one hour (e.g., Dur(b)) there are 6000 batch operations by batch job b on third party system s 130 (e.g., Total_Batch_Ops(b,s)), there would be on average 100 batch operations per minute. However, since this is the average the number of batch operations per minute may be higher or lower. To protect against a worst case scenario in which the batch operations per minute are higher than the average, a multiplier (e.g., 2, 3, or another multiplier) may be used to increase the number of batch operations per minute to 200 or 300 batch operation per minute. Thus, the BZ_Min multiplier transforms the number of operations in the average minute to the number of operations expected during a busiest minute.

Yet further with reference to FIG. 2, operation 208 continues as follows. Second, if a particular batch job b has an incomplete run frequency (e.g., weekdays vs. daily), and if that batch job b runs n times (e.g. n=5 in the weekdays vs. daily case), then n batch jobs are defined as follows, b1, b2, . . . , bn with the same average job duration of the batch job (e.g., Dur(b)) and same SLA (FIG. 3) as the particular batch job b, but each defined batch job running at the next lower frequency schedule (e.g., in the case of weekdays, b1 runs weekly on Mondays, . . . , b5 runs weekly on Fridays . . . ). Third, if a particular batch job b has an over-filled run frequency (e.g., runs twice daily), and if batch job b runs n times (e.g. n=2 in the twice a day case), define n batch jobs, b1, b2, . . . , bn with same average job duration of the batch job (e.g., Dur(b)) as batch job b, with each defined batch job running at the same frequency schedule as the particular batch job b (e.g., defined batch jobs b1 and b2 each run daily with Start_SLA and End_SLA associated with batch job b with over-filled frequency). Thus, operation 208 regularizes batch jobs with irregular run frequencies to batch jobs with regular frequencies (e.g., daily, weekly, monthly).

Still further with reference to FIG. 2, at operation 210, the regularized batch jobs are grouped by the associated run frequencies (e.g., hourly, daily, weekly, monthly, yearly, etc.). For example, the batch jobs may be grouped from the highest frequency (e.g., daily) through to the next highest (e.g., weekly), the next highest (e.g., monthly) and finally the lowest frequency (e.g., yearly). For example, the grouping may be accomplished by grouping daily batch jobs (those that run once or multiple times daily) into group (D), grouping weekly batch jobs into group (W), grouping monthly batch jobs into group (M) and grouping yearly batch jobs into group (Y). At operation 212, the highest frequency not yet scheduled is set. For example, the setting of the frequency may be accomplished by setting a variable S equal to D (e.g., daily). Operations 214 through 226 are then performed for each batch job in the group S of batch jobs identified above. Thus, at operation 214, the start time and the end time are initialized for each batch job b in group S. That is, the start time for batch job b is initialized as Start(b)=h0 and the end time for batch job b is initialized as End(b)=h0+Dur(b). The start time may be initialized to any time. At operation 216, each batch job b operations per hour h (load) on third party system s 130 is computed as the following smooth function of its start time (e.g., Start(b)) and end time (e.g., End(b)):

$$\text{Batch\_Ops}(b, h, s) = \frac{\text{Total\_Batch\_Ops}(b, s)}{\pi \text{Dur}(b)} (\text{Tan}^{-1}(a(h - \text{Start}(b))) - \text{Tan}^{-1}(a(h - \text{End}(b))))$$

atch_Ops(b, h, s), the load generated by batch jobs is a step function. It is noted that any other methodology that provides a close approximation to the Batch_Ops(b, h, s) may also be used.

Further yet with reference to FIG. 2, at operation 218, an optimized start time is computed for each batch job b in the group S that meets constraints and distributes each batch job's load on the third party system s 130 that minimizes the overall load on the third party system s 130. More specifically, for each batch job b in group S, a value of Start(b) that maximizes the following formula is determined:

$$\sum_s \sum_h \left(1 - \text{Bz\_Min} \frac{\text{RT\_Ops}(h, s) + \sum_{b \in S} \text{Batch\_Ops}(b, h, s)}{\text{Max\_Ops}(s)}\right)^2,$$

subject to the following constraints:
Start_SLA(b)≤Start (b)<24 for all batch jobs b in group S;
0≤Start (b)+Dur(b)≤End_SLA(b) for all batch jobs b in group S; and $$\text{BZ\_Min}\left(\text{RT\_Ops}(h, s) + \sum_{b \in S} \text{Batch\_Ops}(b, h, s)\right) \leq \text{Max\_Ops}(s)$$

for third party system s and hour h. The first two constraints ensure that the batch job b satisfies SLA requirements, starting after Start_SLA(b) and ending before End_SLA(b), respectively. The last constraint ensures that the batch jobs in group S will not put excessive load on the third party system s 130.

Additionally with reference to FIG. 2, the previous step 218 computed optimized start times (Start(b)) for all batch jobs in group S subject to the constraints identified therewith. Thereafter, at operation 220 a schedule is generated for all batch jobs in group S. It is noted that the batch jobs in group S in the generated schedule fulfill the foregoing constraints. More specifically, that the start time (Start(b)) of each batch job is after the time specified in the SLA (Start_SLA(b)), the end time (Start (b)+Dur(b)) is before the time specified in the SLA (End_SLA(b)) for that batch job, and that batch jobs in group S will not put excessive load on third party system 130 (e.g., ≤Max_Ops(s)). This completes the scheduling/optimization of highest frequency schedule (e.g., daily schedule D). At operation 222, it is determined whether there another frequency to schedule (e.g., weekly, monthly, yearly, etc.). If there is no other frequency to schedule, the flowchart 200 terminates at operation 228. Alternatively, the flowchart 200 continues at operation 224, in which a load placed by the batch jobs of groups S on the third party system s 130 is calculated and the total or overall load on the third party system s 130 (e.g., RT_Ops(h,s)) is updated to reflect the load placed by the batch jobs in group S as follows:

$$\text{RT\_Ops}(h, s) = \text{RT\_Ops}(h, s) + \text{BZ\_Min} \frac{\sum_{b \in S} \text{Total\_Batch\_Ops}(b, s)}{\text{Dur}(b)}.$$

At operation 226, the next highest frequency not yet scheduled is set (e.g., weekly). More specifically, the variable S is set to group W (e.g., weekly) Thereafter the flowchart 200 continues at operation 214, and performs operations 214-226 for the next highest frequency (e.g., weekly). The operations 214-226 described are performed for each frequency not yet scheduled unit all frequencies of batch jobs have been scheduled.

FIG. 3 is an example table 300 illustrating a service level agreement (SLA) for plural batch jobs to be executed by the example third party system 130 of FIG. 1. The SLA table 300 may be in the business requirement database 106. Form time to time the SLA table 300 may be updated via computer system 102, as described above in reference to FIG. 1. The SLA table includes one or more job name that identify respective batch jobs (e.g., batch job A, B, C, and the like) to be executed by the third party system 130. It is noted that the batch job name may be a descriptive alphanumeric string and the like. For each batch job, the following fields are specified: 1) frequency of execution; 2) number of time of execution; 2) start time (Start_SLA) after which the batch job is to begin; and 3) end time (End_SLA) before which the batch job is to end. For example, bath job A has a daily frequency with only one execution. Batch job B has a daily frequency with two executions (e.g., 10, 20), while batch job C has hourly executions (e.g., at 0, 4, 8, 12, 14, 16 and 20).

FIG. 4 is an example table 400 illustrating performance metrics collected for the plural batch jobs of FIG. 3 executed on the example third party system 130 of FIG. 1. More specifically, the particular batch jobs (e.g., batch jobs A, B and C) of FIG. 3 are executed on the third party system 130 and the metrics of their execution (e.g., operations performed) on the third party system 130 is collected. Table 400 illustrates each of the batch job's metrics, including total operations performed by each batch job and the average job duration of each batch job on the third party system 130 of FIG. 1. The operations may be measured differently depending on what type of operations are performed. In the case of a database, as a batch job will perform on the database multiple types of transactions such (e.g., selects, updates, and the like), these transactions can all be measured in "buffer gets", which is a unit one would use to measure the impact on the database. For instance, assume that a select takes 10 buffer gets and an updated takes 50 buffer gets. Thus, a batch job that performs 200 selects and 50 updates will perform (200*10)+(50*50)=4500 batch operations (e.g., buffer gets) on a database. As noted in reference to FIG. 1, these metrics may be collected by the batch server pool 124 from the third party system 130 and stored to the performance and capacity database 108 for later retrieval and usage by the batch scheduler 110.

FIG. 5A is an example table 500a illustrating a number of operations per hour measured for the third party system 130 of FIG. 1. FIG. 5B is an example table 500b illustrating a maximum operations per hour that the third party system of FIG. 1 can perform. For example, in reference to tables 5A-5B, in the zero hour the third party system 130 has been measured as performing 68,629 operations from a maximum or a total of 120,000 operations. Thus, the headroom (HR) of available capacity on the third party system 130 for the zero hour is approximately 42.81% (e.g., (120,000-68,629)/120,000)), while the headroom HR) available for the twenty-first hour is approximately 2.26% (e.g., (120,000-117,293)/120,000)). The load on the third party system 130 for the zero hour and the twenty-first hour is 57.19% and 97.74%, respectively. Therefore, what is illustrated in tables 5A-5B is the load and available capacity in terms of operations per hour on the third party system 130.

FIG. 6 is an example table 600 that illustrates plural batch jobs of FIG. 3 regularized and grouped by job frequencies in the batch scheduler 110 of FIG. 1. Example table 600 illustrates the input of FIGS. 3-5 consolidated and processed by the batch schedule 110 to a form usable in the scheduling and optimization performed by the batch scheduler 110, described in reference to FIGS. 1 and 2 above. More specifically, the batch jobs have been regularized and grouped as described in reference to operations 208 and 210 with reference to FIG. 2 above. Each batch job is assigned a sequential job id. It is noted that the SLA start and SLA end are expressed in minutes rather than hours. For example with reference to batch job A (e.g., job id=1), a start SLA of 180 minutes means the batch job needs to start after 3:00 AM and an end SLA of 630 means the batch job need to end before 10:30 AM.

FIG. 7 is an example display 700 of batch scheduler of FIG. 1 with an initial schedule of regularized batch jobs of FIG. 6 before optimization of the initial schedule. The schedule generation module 118 of FIG. 1 may generate display 700. As illustrated in the display 700, the start time and end time of each batch has been initialized, as described in operation 214 with reference to FIG. 2 above. For example, the start time of the first job A (e.g., job id=1) is initialized to 740 minutes (e.g., 12:40 PM) and the end time of this job is initialized to 825 minutes (e.g., 1:45 PM), which is the start time 740 (e.g., 12:40 PM) plus the average duration 65 (e.g., 1:05 hr) from table 600 of FIG. 6. As can easily be appreciated, the start time of 740 (e.g., 12:40 PM) is after the SLA start of 180 minutes (e.g., 3:00 PM), and therefore meets the SLA start time. However, the end time of 825 minutes (e.g., 1:45 PM) for the first batch job (e.g., job id=1) is after the SLA end time of 630 minutes (e.g., 10:30 AM), and therefore violates the SLA end time. In table 700, shaded cells show start time or end time violations of respective SLA start or SLA end times of the batch jobs identified by their batch ID numbers. The AVG HR cell (e.g., 27%) is a value that represents the left over or free capacity in the third party system 130 that would result after execution the non-optimized schedule illustrated in table 700 of FIG. 7. More specifically, the AVG HR is a delta between the maximum operations (load) allowed in the third party system 103 (FIG. 5B) and the load that results from the foregoing non-optimized schedule of batch jobs.

FIG. 8 is an example display 800 illustrating the initial schedule of FIG. 7 optimized by the batch scheduler 110 of FIG. 1. The schedule generation module 118 of FIG. 1 may generate display 800. More specifically, steps 216-226 of FIG. 2 have been preformed as described above on the batch jobs illustrated in FIG. 7 to generate the optimized schedule illustrated in FIG. 8. The schedule generation module 118 of FIG. 1 may generate display 800. As can easily appreciated, there are no more violations (e.g., no shaded cells) of the respective SLA start or SLA end times of the batch jobs identified by their batch ID numbers. It is also noted that that the AVG HR increased from 27% to 32%, representing an increase of free capacity in the third party system 130 after executing the optimized schedule illustrated in table 800 of FIG. 8. The average headroom (e.g., AVG HR) may be calculated by operation 224 of FIG. 2 via load update module 120 of FIG. 1.

In reference to FIGS. 1-8, the optimization can be extended to include a file size of a batch job. More specifically, the number of actions a batch job generates may be proportional to a number of lines in an input file or the size of the input file for that batch job. If File_Size(b) is an input file size (e.g., in lines) for a batch job b, it can be determined what maximum input file size Max_File_Size(b) a schedule may support by replacing Batch_Ops(b, h, s) described above in reference to FIG. 2 with the following:

$$\text{Batch\_Ops}(b, h, s) = \text{Bz\_Min} \frac{\text{Batch\_Ops}(b, s)}{\text{File\_Size}(b)} \frac{\text{Max\_File\_Size}(b)}{\text{Dur}(b)}.$$

In the foregoing function it can be determined when a constraint breaks as the maximum file size increases from its current value. More specifically, input file size may be used as a proxy for the number of batch operations (load) that a batch job will generate. It is to be noted that the batch job duration to execute the input file will increase as a result of the increase of file size. The new duration can be estimated as $$\text{Dur}(b) \frac{\text{Max\_File\_size}(b)}{\text{File\_Size}(b)}.$$

Further with reference to FIGS. 1-8, when batch jobs have different scheduling frequencies as described herein, the scheduling problem can still be resolved within this framework described in reference to FIGS. 1-8. For instance, if a job must run hourly, the load generated by this job, $$\text{BZ\_Min} \frac{\text{Total\_Batch\_Ops}(b, s)}{\text{Dur}(b)},$$

can be added to all RT_Ops(h, s) values. For example, if batch job A runs four times a day, four batch jobs like job A may be defined that run once a day with different SLAs that ensure the four daily runs. However, if a batch job that must run at a specific given time is scheduled at this time, the load generated is given by $$\text{BZ\_Min} \frac{\text{Total\_Batch\_Ops}(b, s)}{\text{Dur}(b)}$$

is added to RT_Ops(h,s). Batch jobs that run several times a week but not daily can be treated as follows. Assume for example that a batch job runs on weekdays only. Therefore this situation can be treated as having 5 different weekly batch jobs, each running a different day of the week and each of the batch jobs gets scheduled when scheduling optimization is performed for each day. Weekly batch jobs that do not have a day constraint (e.g., can run on any day of the week but must run once a week) get scheduled after the schedules for daily batch jobs have been set by incorporating the load generated by daily jobs into the RT_OPS(h, s) value for every day. The same applies for monthly jobs.

Figure 9:
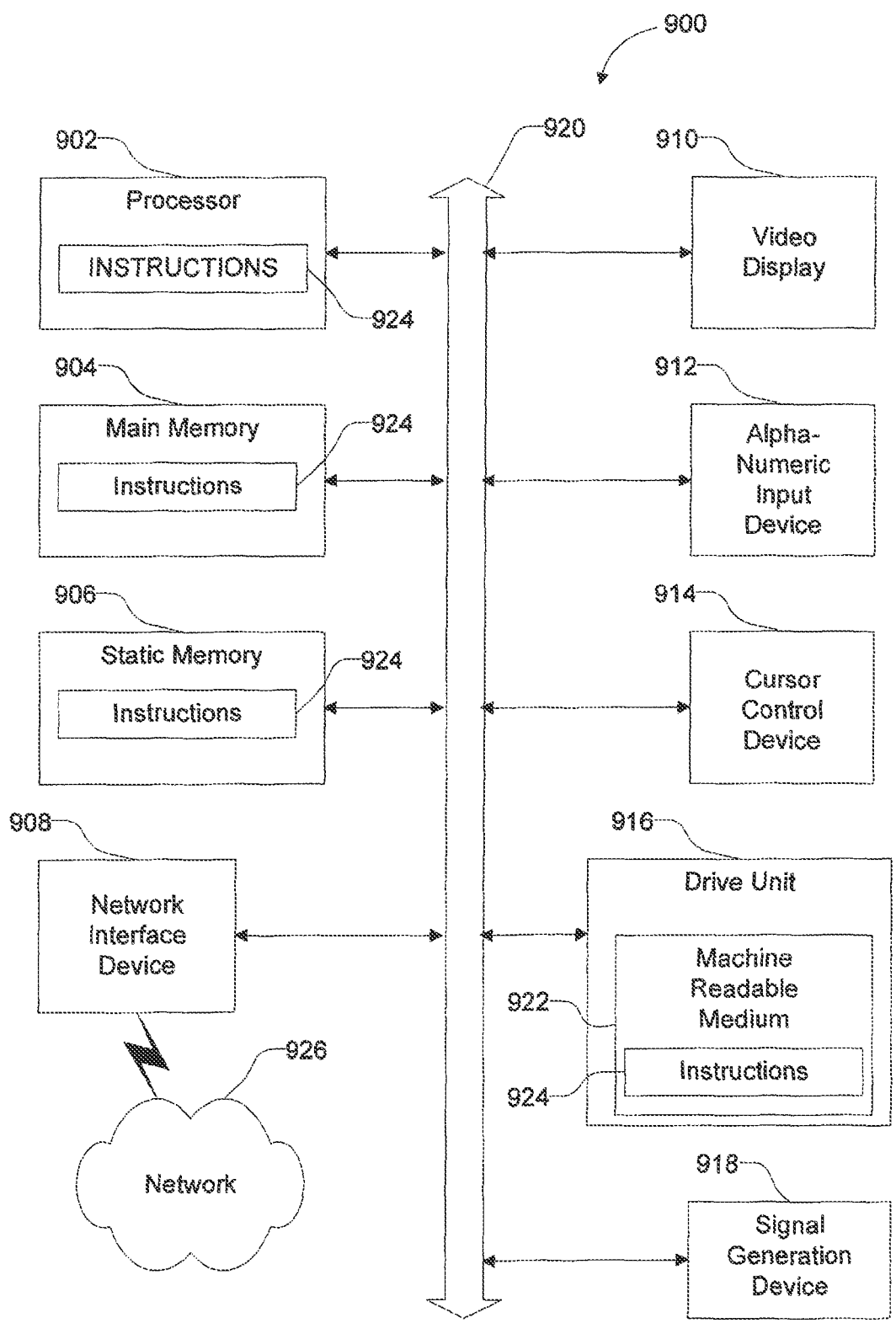
FIG. 9 is a block diagram illustrating an example computer system within which a set of instructions, for causing the computer system to perform any one or more of the methodologies disclosed in FIGS. 1-8, may be executed.

FIG. 9 is a block diagram illustrating an example machine in the example form of a computer system 900 within which a set of instructions, for causing the computer system to perform any one or more of the methodologies disclosed in FIGS. 1-8, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions and data structures (e.g., software 924) embodying or utilized by any one or more of the methodologies or functions described herein. The software 924 may also reside, completely or at least partially, within the main memory 904 and/or within the processor 902 during execution thereof by the computer system 900, the main memory 904 and the processor 92 also constituting machine-readable media.

The software 924 may further be transmitted or received over a network 926 via the network interface device 920 utilizing any one of a number of well-known transfer protocols (e.g., HTTP).

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description In the following description, for purposes of explanation, numerous specific details are set forth in order to provide a thorough understanding of an embodiment of the present invention. It will be evident, however, to one skilled in the art that the present invention may be practiced without these specific details.

What is claimed is:

1. A system comprising:
an input module comprising one or more processors and configured to access:
one or more constraints that constrain the execution of a plurality of batch jobs by a computer system, including constraints from a service level agreement specifying irregular run frequencies for the plurality of batch jobs;
a maximum number of operation per time period of the computer system; and
an expected number of operations per time period on the computer system;
a frequency regularization module comprising one or more processors and configured to:
define, for each batch job of the plurality of batch jobs, multiple batch jobs with regular run frequencies that together perform all irregular runs of the batch job;
group the batch jobs with regular run frequencies into at least one run frequency that includes at least one batch job with a regular run frequency; and
set the at least one run frequency to a first run frequency;

a size determination module comprising one or more processors and configured to:
    determine a size of an input file of the at least one batch job in the first run frequency; and
    determine a maximum size of the input file for the at least one batch job in the first run frequency at a start time that meets the one or more constraints based on subtracting the expected number of operations per time period on the computer system from the maximum number of operation per time period of the computer system for each time period from the start time up to an average duration of the at least one batch job and summing all results of the subtractions; and
a start time determination module comprising one or more processors and configured to begin the at least one batch job in the first run frequency at the start time based on the size of the input file of the at least one batch job in the first run frequency being less than the maximum size of the input file for the at least one batch job in the first run frequency.

2. The system of claim 1, wherein the size of the input file of the at least one batch job is based on a total number of lines in the input file.

3. The system of claim 1, further comprising a time initialization module comprising one or more processors and configured to initialize each batch job's start time to a preset value.

4. The system of claim 1, further comprising a schedule generation module comprising one or more processors and configured to generate a batch job schedule for the first run frequency.

5. The system of claim 4, further comprising a load update module comprising one or more processors and configured to update the expected number of operations per time period on the computer system during the first run frequency based on the batch job schedule for the first run frequency.

6. The system of claim 5, wherein:
the frequency regularization module is further configured to set the at least one run frequency to a second run frequency;
    the size determination module is further configured to:
    determine a size of an input file of the at least one batch job in the second run frequency; and
    determine a maximum size of the input file for the at least one batch job in the second run frequency at a second start time that meets the one or more constraints based on subtracting the updated expected number of operations per time period on the computer system from the maximum number of operation per time period of the computer system for each time period from the second start time up to an average duration of the at least one batch job and summing all results of the subtractions; and
    the start time determination module is further configured to begin the at least one batch job in the second run frequency at the second start time based on the size of the input file of the at least one batch job in the second run frequency being less than the maximum size of the input file for the at least one batch job in the second run frequency.

7. The system of claim 6, wherein:
the schedule generation module is further configured to generate a batch job schedule for the second run frequency; and
the load update module is further configured to update the expected number of operations per time period on the computer system during the second run frequency based on the batch job schedule for the second run frequency.

8. A method comprising:
accessing one or more constraints that constrain the execution of a plurality of batch jobs by a computer system including constraints from a service level agreement specifying irregular run frequencies for the plurality of batch jobs, a maximum number of operation per time period of the computer system, and an expected number of operations per time period on the computer system;
defining, for each batch job of the plurality of batch jobs, multiple batch jobs with regular run frequencies that together perform all irregular runs of the batch job;
grouping the batch jobs with regular run frequencies into at least one run frequency that includes at least one batch job with a regular run frequency;
setting the at least one run frequency to a first run frequency;
determining a size of an input file of the at least one batch job in the first run frequency; and
determining a maximum size of the input file for the at least one batch job in the first run frequency at a start time that meets the one or more constraints based on subtracting the expected number of operations per time period on the computer system from the maximum number of operation per time period of the computer system for each time period from the start time up to an average duration of the at least one batch job and summing all results of the subtractions; and
beginning the at least one batch job in the first run frequency at the start time based on the size of the input file of the at least one batch job in the first run frequency being less than the maximum size of the input file for the at least one batch job in the first run frequency.

9. The method of claim 8, wherein the size of the input file of the at least one batch job is based on a total number of lines in the input file.

10. The method of claim 8, further comprising initializing each batch job's start time to a preset value.

11. The method of claim 8, further comprising generating a batch job schedule for the first run frequency.

12. The system of claim 11, further comprising updating the expected number of operations per time period on the computer system during the first run frequency based on the batch job schedule for the first run frequency.

13. The method of claim 12, further comprising:
setting the at least one run frequency to a second run frequency;
    computing a size of an input file of the at least one batch job in the second run frequency; and
    determining a maximum size of the input file for the at least one batch job in the second run frequency at a second start time that meets the one or more constraints based on subtracting the updated expected number of operations per time period on the computer system from the maximum number of operation per time period of the computer system for each time period from the second start time up to an average duration of the at least one batch job and summing all results of the subtractions; and
    beginning the at least one batch job in the second run frequency at the second start time based on the size of the input file of the at least one batch job in the second run frequency being less than the maximum size of the input file for the at least one batch job in the second run frequency.

14. The method of claim 13, further comprising:

generating a batch job schedule for the second run frequency; and updating the expected number of operations per time period on the computer system during the second run frequency based on the batch job schedule for the second run frequency.

15. A machine-readable hardware storage device containing instructions that, when executed by a processor of a machine, cause the machine to perform operations comprising:

accessing one or more constraints that constrain the execution of a plurality of batch jobs by a computer system including constraints from a service level agreement specifying irregular run frequencies for the plurality of batch jobs, a maximum number of operation per time period of the computer system, and an expected number of operations per time period on the computer system;

defining, for each batch job of the plurality of batch jobs, multiple batch jobs with regular run frequencies that together perform all irregular runs of the batch job;

grouping the batch jobs with regular run frequencies into at least one run frequency that includes at least one batch job with a regular run frequency;

setting the at least one run frequency to a first run frequency;

determining a size of an input file of the at least one batch job in the first run frequency; and determining a maximum size of the input file for the at least one batch job in the first run frequency at a start time that meets the one or more constraints based on subtracting the expected number of operations per time period on the computer system from the maximum number of operation per time period of the computer for each time period from the start time up to an average duration of the at least one batch job and summing all results of the subtractions; and beginning the at least one batch job in the first run frequency at the start time based on the size of the input file of the at least one batch job in the first run frequency being less than the maximum size of the input file for the at least one batch job in the first run frequency.

16. The machine-readable hardware storage device of claim 15, wherein the size of the input file of the at least one batch job is based on a total number of lines in the input file.

17. The machine-readable hardware storage device of claim 15, the operations further comprising initializing each batch job's start time to a preset value.

18. The machine-readable hardware storage device of claim 15, the operations further comprising generating a batch job schedule for the first run frequency.

19. The machine-readable hardware storage device of claim 18, the operations further comprising updating the expected number of operations per time period on the computer system during the first run frequency based on the batch job schedule for the first run frequency.

20. The machine-readable hardware storage device of claim 19, the operations further comprising:

setting the at least one run frequency to a second run frequency;

computing a size of an input file of the at least one batch job in the second run frequency; and determining a maximum size of the input file for the at least one batch job in the second run frequency at a second start time that meets the one or more constraints based on subtracting the updated expected number of operations per time period on the computer system from the maximum number of operation per time period of the computer for each time period from the second start time up to an average duration of the at least one batch job and summing all results of the subtractions; and beginning the at least one batch job in the second run frequency at the second start time based on the size of the input file of the at least one batch job in the second run frequency being less than the maximum size of the input file for the at least one batch job in the second run frequency.

* * * * *